United States Patent
Wheatley (10) Patent No.: US 7,829,790 B2
(45) Date of Patent: Nov. 9, 2010

(54) MULTI-FUNCTION CABLE STUDS AND METHODS OF ASSEMBLING THE SAME

(75) Inventor: William Edward Wheatley, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 129 days.

(21) Appl. No.: 12/255,846

(22) Filed: Oct. 22, 2008

(65) Prior Publication Data

US 2010/0096158 A1    Apr. 22, 2010

(51) Int. Cl.
*H01R 9/05* (2006.01)
(52) U.S. Cl. .................................... 174/75 C
(58) Field of Classification Search ............... 174/74 R, 174/75 C, 78; 439/98, 583
See application file for complete search history.

(56) References Cited

U.S. PATENT DOCUMENTS

| | | | |
|---|---|---|---|
| 4,046,451 A | * | 9/1977 | Juds et al. ................... 439/583 |
| 4,304,148 A | | 12/1981 | Hamman |
| 4,503,283 A | | 3/1985 | Hancock et al. |
| 4,804,338 A | * | 2/1989 | Dibble et al. ................ 439/583 |
| 7,153,146 B2 | * | 12/2006 | Shimizu et al. ............... 439/98 |

FOREIGN PATENT DOCUMENTS

WO    WO-9515601    6/1995

* cited by examiner

*Primary Examiner*—Chau N Nguyen
(74) *Attorney, Agent, or Firm*—Fox Rothschild, LLP; Robert J. Sacco (57) ABSTRACT

Cable assemblies comprising a cable (102), an integrally formed cable stud (IFCS) disposed around the cable, a securing member (502, 1100), and a crimp ring (508). The IFCS (108) includes tubular bodies (530, 532, 534) of different sizes horizontally aligned along a common central axis (550) and a flange (536). The flange is disposed between a first and a second one of the tubular bodies and extends outwardly therefrom. The securing member (e.g., a heat deformable tube) is disposed around a first portion of the cable having an exterior insulation material disposed thereon and the first tubular body so as to form a seal therebetween. The crimp ring is formed of a deformable material electrically and mechanically coupling a shielding material of the cable to a third one of the tubular bodies.

18 Claims, 8 Drawing Sheets

MULTI-FUNCTION CABLE STUDS AND METHODS OF ASSEMBLING THE SAME

BACKGROUND OF THE INVENTION

1. Statement of the Technical Field

The present invention relates to cable stud assemblies. More particularly, the present invention relates to multi-function cable stud assemblies for discrete wire cable applications and/or coaxial cable applications.

2. Description of the Related Art

There are many electrical cables known to those having ordinary skill in the art. Such electrical cables include discrete wire cables and coaxial cables. These electrical cables typically comprise one or more insulted cable wires having a foil shield, a braided shield and an exterior insulation material (or jacket) disposed thereon. These cables often need to pass through equipment bulkheads or interconnect devices. The cable stud assemblies provide physical attachment point and environmental seals around the cables at locations where they pass through equipment bulkheads or interconnect devices. The cable stud assemblies can withstand stress and strain to prevent the cable from being dislodged from the bulkheads or interconnect devices.

Each cable stud assembly typically comprises four (4) custom components. The custom components include a crimp ring, a cable stud, a braid adaptor, and a sealing guard (or bushing). The cable stud assembly is mechanically and electrically secured to the bulkhead or interconnect device at the location where the cable passes through the bulkhead or interconnect device.

In order to assemble a cable stud assembly, a portion (e.g., a four inch portion or a six inch portion) of the exterior insulation material (or jacket) is removed from an end of an electrical cable. As a result, an underlying braided shield is exposed. The end of the electrical cable is taped for protecting the cable wires from damage (e.g., fraying) during the cable stud assembly process. Subsequently, the cable stud and crimp ring are disposed on a remaining portion of the electrical cable's exterior insulation material (or jacket). Next, a slit is formed in an end portion of the exterior insulation material (or jacket) so that it can be pulled over itself without the use of a tool. Also, lubricant is disposed on the end portion of the exterior insulation material (or jacket). Once the exterior insulation material (or jacket) has been lubricated and pulled over itself, the braided shield is unraveled and combed back over the jacket. As a result, a foil shield of the electrical cable is exposed.

Thereafter, the braid adaptor is disposed over the cable wires and exposed foil shield so as to abut a fold/seam of the pulled over shield. The shield is then pulled over a portion of the braid adaptor and trimmed. An adhesive is disposed over the portion of the shield disposed on the braid adaptor. The jacket is then pulled over the braid adaptor with the adhesive disposed thereon and trimmed. The partially assembled cable stud assembly is then cured for a predefined period of time (e.g., twenty-four hours). After expiration of the predefined period of time, the cable stud is pushed forwards until it partially covers the braid adaptor. Tape is then applied over the remaining exposed portion of the foil shield.

Next, the crimp ring is moved forwards until it reaches a position where it abuts the cable stud. Thereafter, the crimp ring is crimped using a crimping tool. This crimping process creates pressure in the insulation jacket that often results in the splitting of the insulation jacket. As a result of the splitting, the environmental seal is broken. Upon crimping the crimp ring, the sealing guard (or bushing) is moved to a position where it is placed over the tape and abuts a face of the braid adaptor. The sealing guard (or bushing) is a rubber stopper that is squeezed to form an environmental seal between the cable stud assembly and a housing.

Despite the advantages of the conventional cable stud assembly, it suffers from certain drawbacks. For example, four (4) custom components are required. The custom components provide a cable stud assembly that is relatively expensive to manufacture. Further, the method of assembling the cable stud assembly is cumbersome and time consuming.

SUMMARY OF THE INVENTION

Embodiments of the present invention relate to cable assemblies. Cable assembly embodiments comprise a cable, an integrally formed cable stud, a heat deformable tube, a crimp ring, and a gasket. The heat deformable tube and/or gasket can be commercial off-the-shelf (COTS) components. The gasket can be an o-ring gasket. The integrally formed cable stud is disposed on the cable. The integrally formed cable stud comprises a plurality of tubular bodies of different sizes horizontally aligned along a common central axis. The integrally formed cable stud also comprises a flange disposed between a first and a second one of the tubular bodies and extending outwardly therefrom. A third one of the tubular bodies is disposed adjacent to the second tubular body. The flange has a cavity formed therein sized and shaped to receive at least a portion of the gasket.

The first tubular body includes a sidewall having an inner diameter larger than the inner diameters of the sidewalls of the second and third tubular bodies. The inner diameter of the first tubular body is sized and shaped for snuggly fitting around the first portion of the cable having the exterior insulation material disposed thereon. The inner diameters of the second and third tubular bodies are sized and shaped for receiving a second portion of the cable having the exterior insulation material removed therefrom. The second and third tubular bodies have apertures formed therethrough with the same diameters. The second tubular body has threads formed thereon.

The securing member is disposed around a first portion of the cable having an exterior insulation material disposed thereon and the first tubular body so as to form a seal therebetween. The securing member can include a heat deformable tube snugly fit around a first portion of the cable and the first tubular body. The heat deformable tube can include an inner surface having a layer of adhesive disposed thereon. The securing member can be disposed around the first portion of the cable and an overmold anchor of the first tubular body. The crimp ring is formed of a deformable material electrically and mechanically coupling a shielding material of the cable to the third tubular body.

The cable assembly further comprises a stop ledge defined by a chamfered inner surface of the integrally formed cable stud. An annular face disposed at an end of the insulation exterior material abuts the stop ledge. An adhesive is disposed between the annular face of the exterior insulation material and the stop ledge.

Embodiments of the present invention also concern methods for assembling the cable assembly. The methods involve removing an exterior insulation material from an end of a cable, and disposing tape around the end of the cable. Thereafter, the cable is inserted into the integrally formed cable stud until the annular face of the exterior insulation material abuts a stop ledge of the integrally formed cable stud. The cable and/or cable stud can be turned in a clockwise or counter clockwise direction.

Subsequently, an environmental seal is provided between the cable and the integrally formed cable stub. The environmental can be provided by sliding a heat deformable tube along the cable towards the integrally formed cable stud until the heat deformable tube is at least partially positioned over the first tubular body and heating the heat deformable tube. The environmental seal can also be provided by disposing a layer of securing member around a first portion of the cable having an exterior insulation material disposed thereon and an overmold anchor of the first one of the plurality of tubular bodies. A 360° electrical shield is provided by sandwiching a portion of a shield material of the cable between a crimp ring and the third tubular body. A gasket can be disposed in a cavity formed in the flange of the integrally formed cable stud.

Prior to inserting the cable into the integrally formed cable stud, the heat deformable tube can be positioned on a portion of the cable. The heat deformable tube can include a layer of adhesive disposed on an inner surface thereof. An adhesive can be applied around an annular face of the exterior insulation material disposed at an end thereof.

Prior to forming the 360° electrical shield, the tape can be removed from the end of the cable. The shield material can be cut to a predefined length and rolled over the third tubular body. Alternatively, the shield material can be unraveled and combed over the third tubular body.

BRIEF DESCRIPTION OF THE DRAWINGS

Embodiments of the present invention will be described with reference to the following drawing figures, in which like numerals represent like items throughout the figures, and in which.

DETAILED DESCRIPTION OF THE PREFERRED EMBODIMENTS

Embodiments of the present invention will now be described with respect to FIGS. 1-11. Embodiments of the present invention relate to cable stud assemblies and methods of assembling the same. More particularly, embodiments of the present invention relate to multi-function cable stud assemblies for electrical cable applications. The electrical cables can include, but are not limited to, discrete wire cables and coaxial cables. The electrical cables typically comprise one or more insulated cable wires having a foil shield, a braided shield and an exterior insulation material (or jacket) disposed thereon.

Before describing the multi-function cable stud assemblies of the present invention, it will be helpful in understanding an exemplary environment in which the invention can be utilized. In this regard, it should be understood that the multi-function cable stud assemblies of the present invention can be utilized in a variety of different applications where cables pass through equipment bulkheads or interconnect devices and need to have an environmental seal formed therearound. Such applications include, but are not limited to, military applications, aquatic applications, and outdoor applications.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Figure 1:
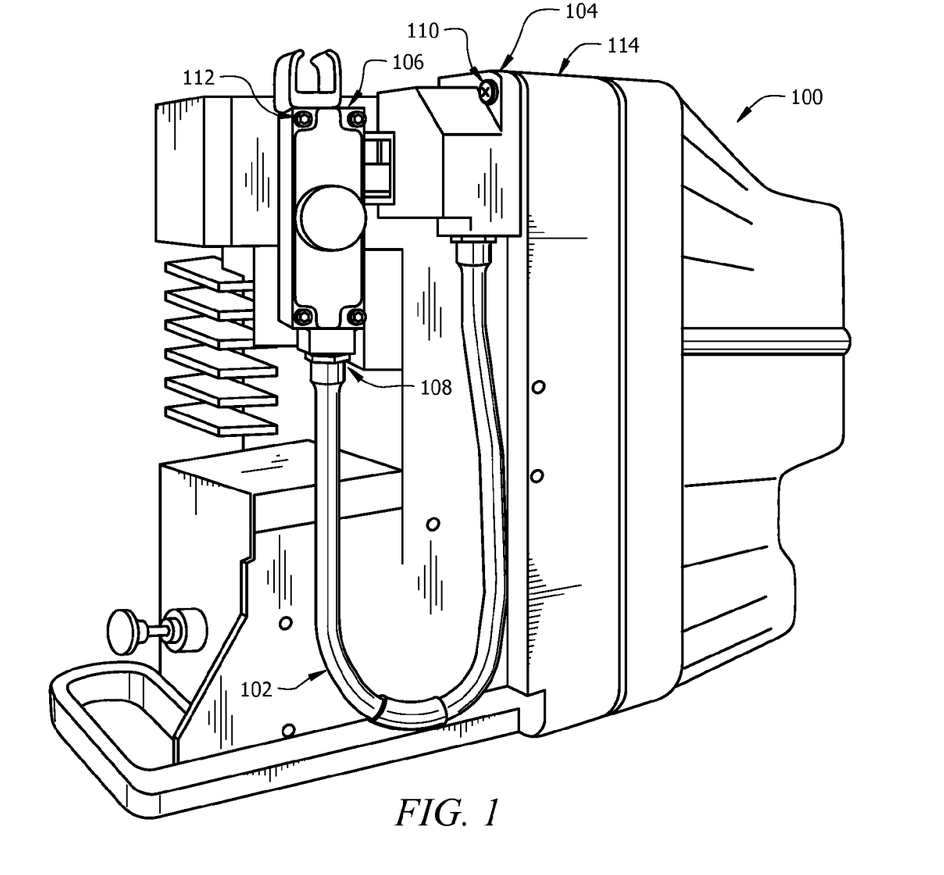
FIG. 1 is a perspective view of an electrical cable connected to an object that is useful for understanding the present invention.

Referring now to FIG. 1, there is provided a perspective view of an electrical cable 102 connected to an object 100 that is useful for understanding the present invention. A perspective view of the electrical cable 102 decoupled from the object 100 is provided in FIG. 2. Although the object 100 is shown in FIG. 1 to be a radio, embodiments of the present invention are not limited in this regard. For example, the object 100 can alternatively or additionally include a handheld radio, a sensor and a light. The electrical cable 102 can include, but is not limited to, a discrete wire cable and a coaxial cable. Discrete wire cables and coaxial cables are well known to those having ordinary skill in the art, and therefore will not be described herein.

Figure 2:
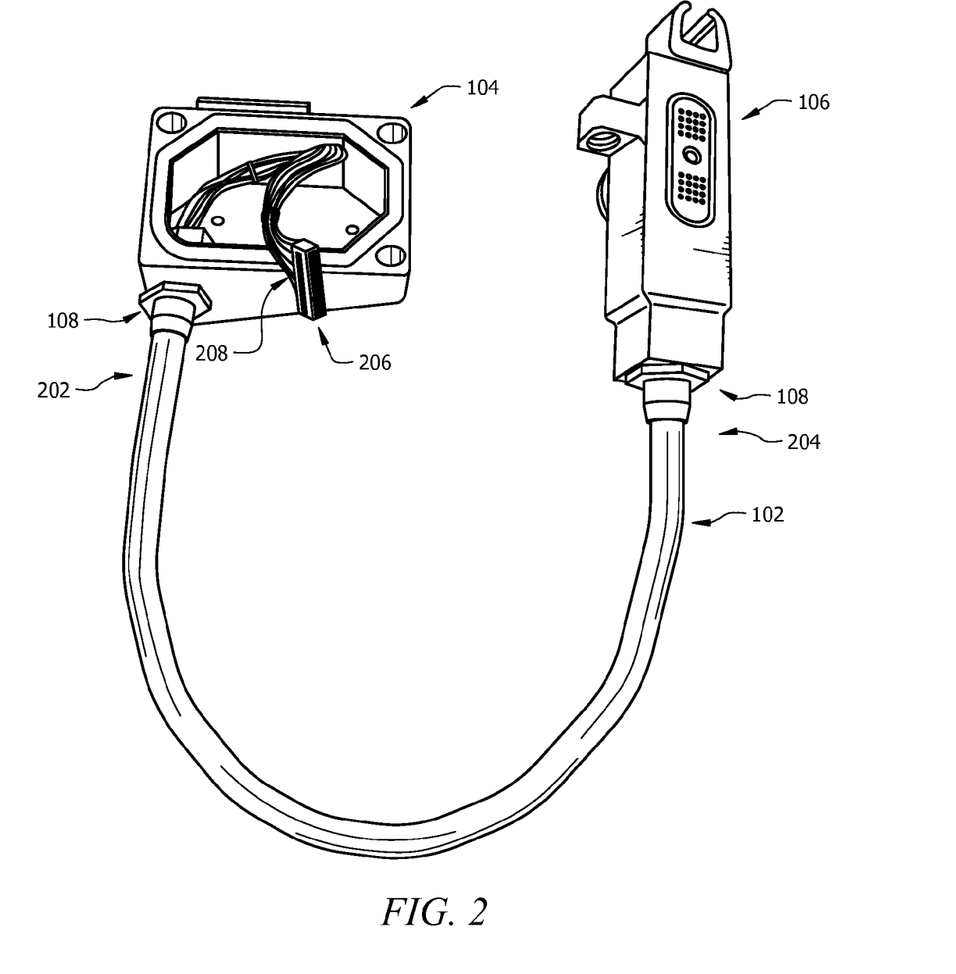
FIG. 2 is a perspective view of the electrical cable shown in FIG. 1 decoupled from the object that is useful for understanding the present invention.

As shown in FIGS. 1-2, the electrical cable 102 can be mechanically coupled to and decoupled from the radio 100 by bulkheads 104, 106. Bulkheads 104, 106 are well known to those having ordinary skill in the art, and therefore will not be described herein. However, it should be understood that any type of bulkhead assembly can be used without limitation provided that it can mate with a cable stud assembly 108. It should also be understood that the bulkheads 104, 106 can generally be coupled to and decoupled from the radio via one or more mechanical connectors 110, 112 (e.g., screws). Each of the bulkheads 104, 106 can also provide an environmental seal between itself and a housing 114 of the radio 100. It should also be understood that the present invention is not limited to bulkhead applications. The present invention can be used in connection with bulkheads and/or interconnect devices.

As also shown in FIGS. 1-2, a cable stud assembly 108 can be disposed at each opposing end 202, 204 of the cable 102. However, embodiments of the present invention are not limited in this regard. A cable stud assembly 108 can be disposed on one or more ends 202, 204 of the cable 102. Each cable stud assembly 108 is configured for mating with a bulkhead 104, 106. For example, each cable stud assembly 108 can include a threaded post (not shown) configured to engage a threaded aperture (not shown) of a bulkhead 104, 106.

Each cable stud assembly 108 is also configured for allowing insulated cable wires 208 of the cable 102 to pass therethrough and into a bulkhead 104, 106 (as shown in FIG. 2). As such, the insulated cable wires 208 of the cable 102 can be electrically connected to one or more internal circuits of the radio 100. For example, the insulated cable wires 208 of the cable 102 can be coupled to an electrical pug 206 that mates to an electrical socket (not shown) of the radio 100 (as shown in FIG. 2). Although the electrical plug 206 is shown in FIG. 2 to be a pin connector, embodiments of the present invention are not limited in this regard. The electrical plug 206 can be of any type selected in accordance with a particular cable application.

Each cable stud assembly 108 can provide an environmental seal around the cable 102 at the location where the cable 102 passes through the equipment bulkhead 104, 106. Similarly, each cable stud assembly 108 can provide an environmental seal between itself and a bulkhead 104, 106. Each cable stud assembly 108 is designed to prevent stress and strain on the cable from causing damage to the electrical connections internal to the equipment. The cable stud assemblies 108 will be described in more detail below in relation to FIGS. 3-6.

Figure 3:
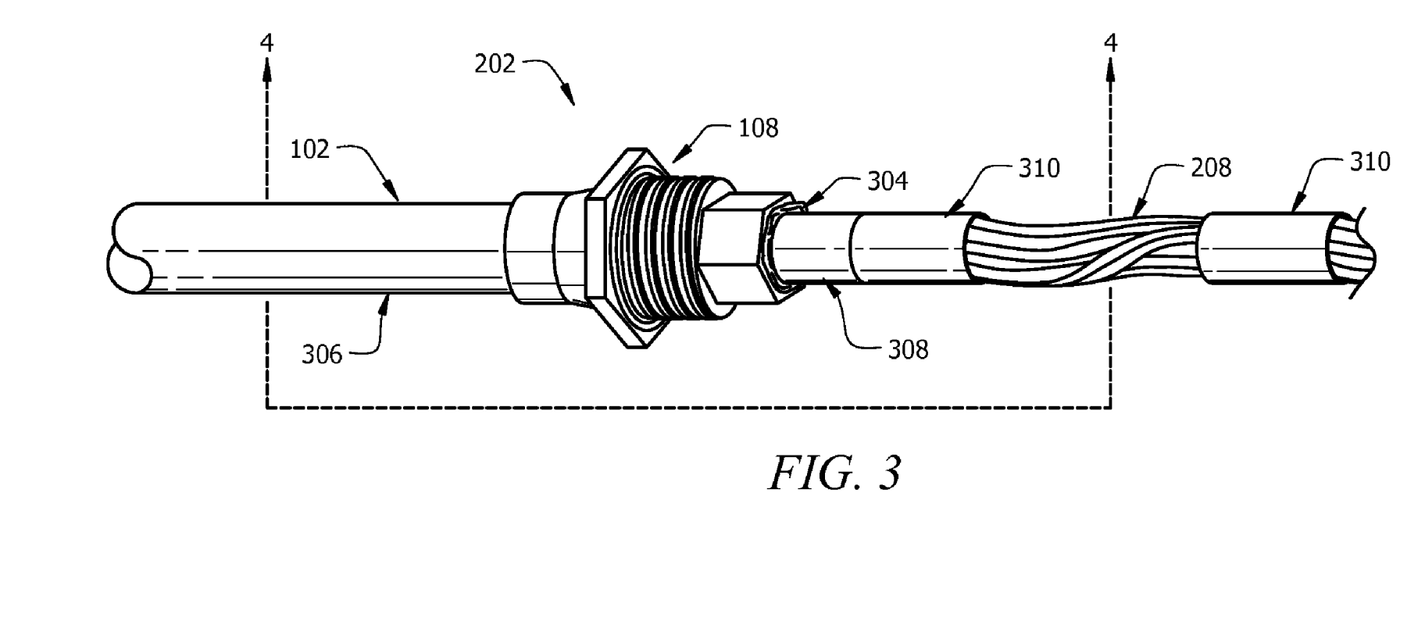
FIG. 3 is a side view of an end of the electrical cable of FIGS. 1-2 decoupled from a bulkhead to show a cable stud.
Figure 4:
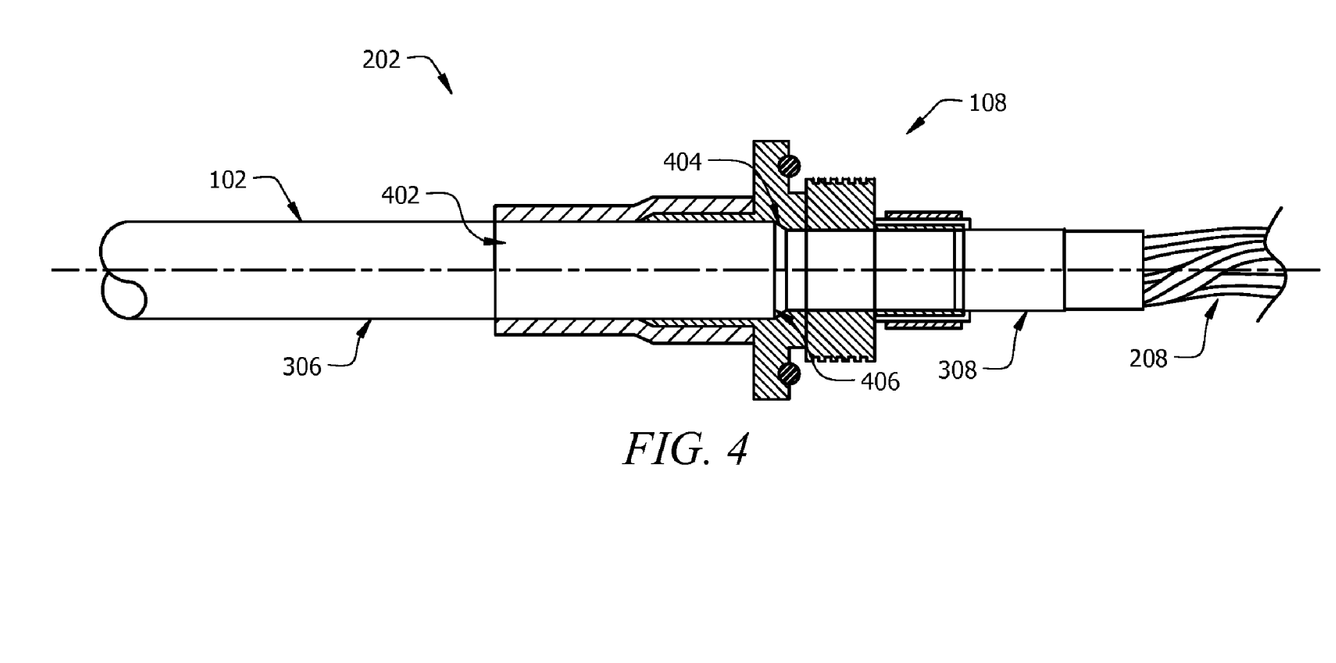
FIG. 4 is a cross-sectional view of a portion of the electrical cable including the cable stud taken along line 4-4 of FIG. 3.

Referring now to FIG. 3, there is provided a side view of an end 202 of the electrical cable 102 decoupled from the bulkhead 104 that is useful for understanding the present invention. A cross-sectional view of the end 202 of the electrical cable 102 is provided in FIG. 4. As shown in FIGS. 3-4, the cable 102 can generally comprise a plurality of insulted cable wires 208, a foil shield 308, a braided shield 304, and an exterior insulation material (or jacket) 306. Prior to being inserted into the cable stud assembly 108, a portion of the insulation jacket 306 and/or braided shield 304 is removed therefrom. As a result, the underlying braided shield 304 and/or foil shield 308 is exposed. Tape 310 is placed around one or more portions of the electrical cable 102 for protecting the cable wires and/or foil shield 308 from damage (e.g., fraying) during the cable stud assembly process. An exemplary cable stud assembly process will be described below in relation to FIG. 7.

As shown in FIG. 4, the cable stud assembly 108 comprises an aperture 402 sized and shaped to receive the cable 102. The cable stud assembly 108 also comprises a stop ledge 404 for ensuring that the cable 102 is inserted a pre-defined distance into aperture 402. As a result of the stop ledge 404, the cable 102 can be inserted into the aperture 402 until an annular face 406 disposed at an end of the insulation jacket 306 abuts the stop ledge 404. The cable stud assembly 108 will be described in more detail below in relation FIGS. 5-6.

Figure 5:
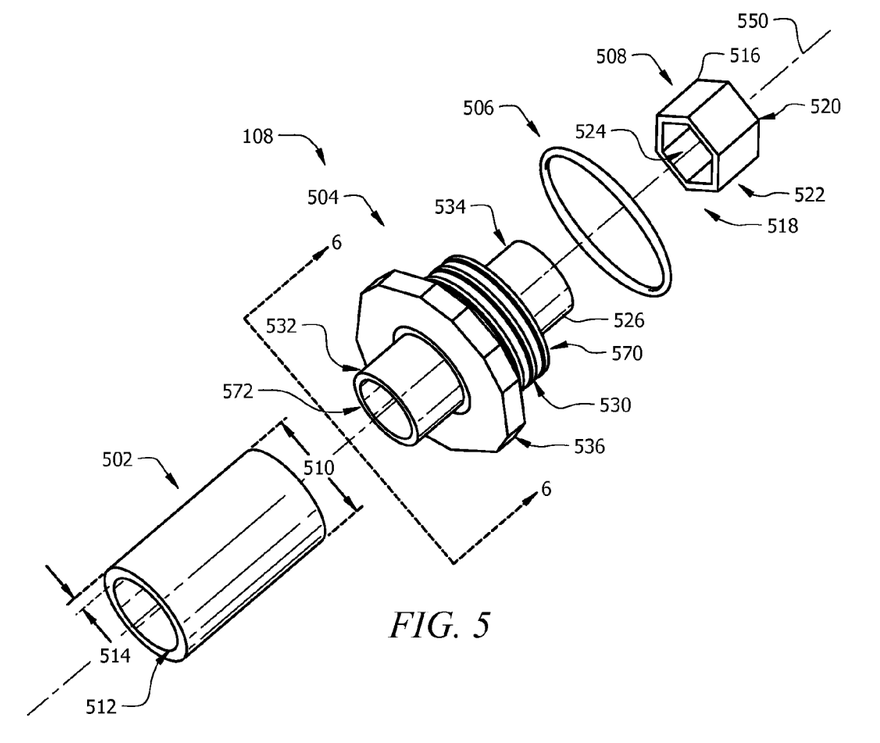
FIG. 5 is an exploded perspective view of the cable stud assembly shown in FIGS. 3 and 4 that is useful for understanding the present invention.

Referring now to FIG. 5, there is provided an exploded perspective view of the cable stud assembly 108 shown in FIGS. 1-4 that is useful for understanding the present invention. As shown in FIG. 5, the cable stud assembly 108 is comprised of a heat deformable tube 502, a cable stud 504, a gasket 506, and a crimp ring 508. The heat deformable tube 502 is generally a tube formed of a heat shrink material which shrinks in diameter 510 when heated using a heating means. Such heating means include, but are not limited to, hot air guns, soldering irons, and lighters. The heat from the heating means can cause the heat deformable tube 502 to contract as far as one sixth (⅙) of its original diameter 510. As a result, the heat deformable tube 502 can snuggly fit over regularly and irregularly shaped surfaces and objects (e.g., the cable 102 and cable stud 504). For example, the heat deformable tube 502 can snuggly fit over an irregularly shaped surface of the cable stud assembly 108 defined by a portion of the cable 102 having the insulation jacket 306 disposed thereon and the cable stud 504. The snuggly fit tube 502 provides a smooth transition and environmental seal between the cable 102 and cable stud 504.

The heat deformable tube 502 can include a layer of thermoplastic adhesive (not shown) on its inside surface 512 to help provide an environmental seal and better adhesion to the objects (e.g., the cable 102 and cable stud 504). The heat deformable tube 502 can generally be formed of a material that can resist corrosion, water absorption, and/or fungus growth. Such materials include, but are not limited to, polyolefin, fluoropolymer, polyvinyl chloride, neoprene, silicone, and other thermoplastic materials.

According to an embodiment of the present invention, the heat deformable tube 502 is a heat shrink tube having a part number FIT-750 available from Alpha Wire Company of Elizabeth, N.J. The heat deformable tube 502 has a diameter 510 with a value between a quarter inch (0.24 inch) to one and a half inches (1.5 inch), inclusive. The heat deformable tube 502 has a shrink ratio of two (2) to one (1) at one hundred twenty one degrees Celsius (121° C.). The heat deformable tube 502 has a wall thickness 514 between three hundredths of an inch (0.03 inch) and half an inch (0.5 inch), inclusive. The heat deformable tube 502 has an adhesive liner (not shown) disposed on its inside surface 512. The heat deformable tube 502 is formed of a non-corrosive material that is resistant to fungus growth and water absorption. Embodiments of the present invention are not limited in this regard.

The gasket 506 can provide an environmental seal between the cable stud 504 and a surface of a bulkhead (e.g., the bulkhead 104, 106 shown in FIGS. 1-2). The environmental seal prevents moisture from seeping into the cable stud 504 and the bulkhead. More particularly, the gasket 506 prevents leakage between the cable stud 504 and bulkhead while under compression. The gasket 506 is formed of a material that is able to deform and tightly fill a space between the cable stud 504 and bulkhead. Such materials include, but are not limited to, rubbers.

According to an embodiment of the present invention, the gasket 506 is a continuous molded gasket formed of silicone rubber having a hardness between forty (40) and ninety (90) durometers. Embodiments of the present invention are not limited in this regard. The gasket 506 can be formed of any material selected in accordance with a particular cable stud assembly application.

The crimp ring 508 is provided for attachment to an end portion 526 of the cable stud 504. More particularly, the crimp ring 508 is provided to electrically and mechanically couple the braided shield 304 of the cable 102 to the end portion 526 of the cable stud 504 so as to form a three hundred sixty degree)(360° electrical shield. The 360° electrical shield can reduce electrical noise from affecting signals communicated via the cable 102. The 360° electrical shield can also reduce electromagnetic radiation that may interfere with other devices. The 360° electrical shield can further minimize capacitively coupled noise from other electrical sources.

The electrical and mechanical coupling of the braided shield 304 to the cable stud 504 is facilitated by radially depositing the braided shield 304 between the end portion 526 of the cable stud 504 and the crimp ring 508. The electrical and mechanical coupling is also facilitated by crimping the outside of the crimp ring radially inward using a crimping technique. The crimping technique generally involves compressing the crimp ring around the end portion 526 of the cable stud 504 with the braided shield 304 sandwiched therebetween. The crimping can be accomplished with a crimp tool whose jaws reduce the crimp ring to the crimp tool's internal configurations and dimensions. The crimp tool can include any crimping tool known to those having ordinary skill in the art.

As shown in FIG. 5, the crimp ring 508 comprises a tubular body 516 that can be crimped to a circular shape (not shown), a hex shape (shown in FIG. 5), or any other suitable configuration. The tubular body 516 has a front end 520, a rear end 518, and an intermediate section 522. The portion 526 of the cable stud 504 is receivable within the tubular body 516 from the front or rear end 520, 518. The tubular body 516 has an aperture 524 formed therein. The aperture 524 is sized and shaped to receive the portion 526 of the cable stud 504. The tubular body 516 is deformable inwardly around the end portion 526 of the cable stud 504. The tubular body 516 is formed of a deformable and/or non-corrosive material. Such materials include, but are not limited to, brass, steel, other metal materials, and composite materials.

According to an embodiment of the present invention, the crimp ring 508 is formed of a thin walled brass tube cut to a specific length (e.g., half an inch). The thin walled brass tube is then crimped to a hex shape as shown in FIG. 5. Embodiments of the present invention are not limited in this regard.

The cable stud 504 comprises tubular bodies 530, 532, 534, a flange 536, and a aperture (or bore) 572 passing therethrough. The aperture 572 is sized and shaped to receive at least a portion of a cable 102. Each of the tubular bodies 530, 532, 534 can have a generally hollow tubular shape with a circular outer cross section (as shown in FIG. 5), a hexagonal outer cross section (not shown), a rectangular cross section (not shown), or any combination thereof. The flange 536 is disposed between a first and second one of the tubular bodies 530 and 532 and extends outwardly therefrom. The second one of the tubular bodies 530 is disposed between the first one of the tubular bodies 532 and a third one of the tubular bodies 534. The third one of the tubular bodies 534 is coupled to or disposed on at least partially exposed face 570 of the second tubular body 530.

Although the flange 536 is shown to have a hex shape, embodiments of the present invention are not limited in this regard. The flange 536 can have any shape selected in accordance with a particular cable stud assembly application. However, it should be appreciated that the hex shape of the flange 536 facilitates the securement of the cable stud assembly 108 to a bulkhead (e.g., the bulkhead 104, 106 of FIGS. 1-2).

Each of the cable stud components 530, 532, 534, 536 can be integrally formed via any suitable machining process and/or injection molding process. Such machining processes include, but are not limited to, lathe processes, etching processes, and milling processes. Each of these components can be formed of any suitable material. Such materials include, but are not limited to, brass, stainless steel, other metal materials, and composite materials.

Figure 11:
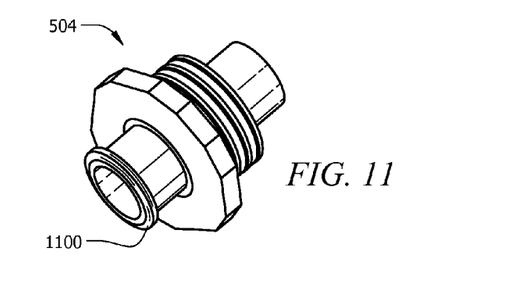
FIG. 11 is a perspective view of cable stud comprising an overmold anchor.

According to an embodiment of the present invention, the cable stud 504 further comprises an overmold anchor 1100 as shown in FIG. 11. In such a scenario, the cable stud assembly 108 can be absent of the heat deformable tube 502. The overmold anchor 1100 facilitates the securement of a cable (e.g., the cable 102 of FIGS. 1-2) to the cable stud 504. For example, a portion of the cable 102 is inserted through the cable stud 504. Thereafter, the cable stud 504 with the cable 102 passing therethrough is placed in an injection molding device. The injection molding device disposes a securing member (not shown) around a portion of the cable 102 adjacent to the cable stud 504 and the overmold anchor 1100 of the cable stud 504. The securing member can include, but is not limited to, a plastic member. In effect, the cable 102 is secured to the cable stud 504. Also, an environmental seal is formed between the cable 102 and the cable stud 504. Embodiments of the present invention are not limited in this regard.

Figure 6:
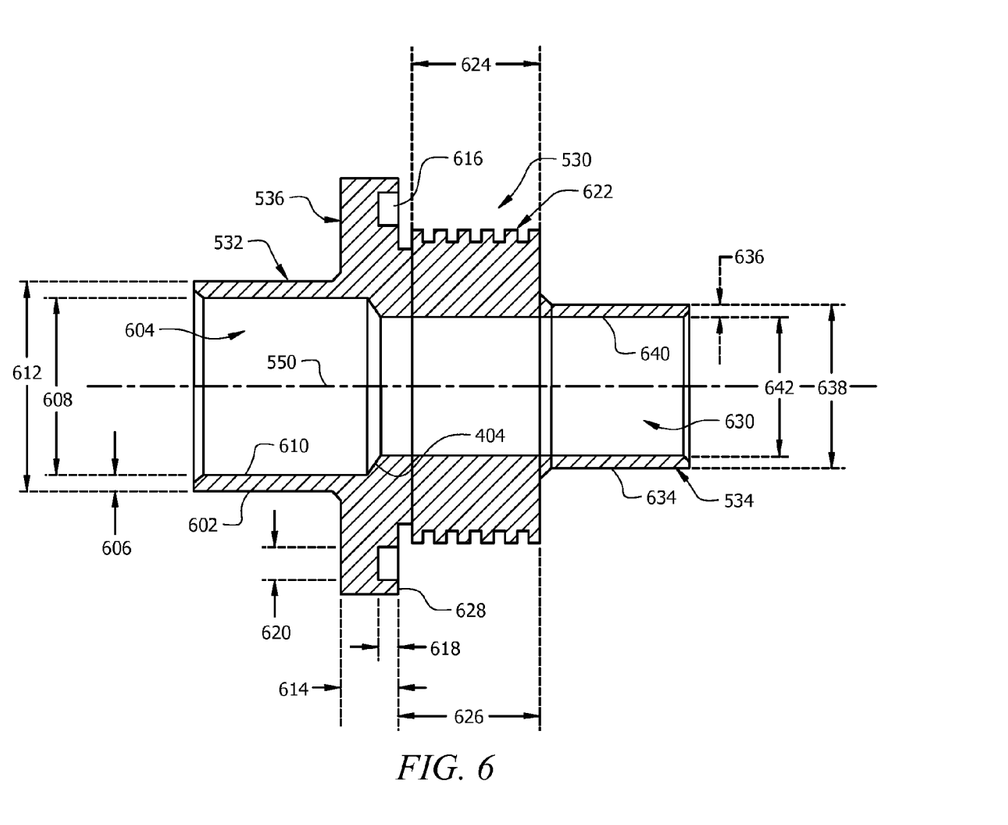
FIG. 6 is a cross-sectional view of the cable stud taken along line 6-6 of FIG. 5.

A cross-sectional view of the cable stud 504 taken along line 6-6 of FIG. 5 is provided in FIG. 6. As shown in FIG. 6, the tubular bodies 530, 532, 534 and the flange 536 are aligned along a common, central axis 550. The tubular body 532 is defined by an annular sidewall 602 having a thickness 606 and an outer diameter 612. The tubular body 532 is also defined by an aperture 604 having a diameter 608. The aperture 604 is defined by an inner surface 610 of the sidewall 602 and the stop ledge 404. According to an embodiment of the present invention the stop ledge 404 has a chamfered angle between fifteen and seventy degrees) (15°-70°. Embodiments of the present invention are not limited in this regard.

As also shown in FIG. 6, the flange 536 is disposed between the tubular body 532 and the tubular body 530 and extends outwardly therefrom. The flange 536 has a thickness 614 and a width (not shown). The flange 536 has a cavity 616 radially formed therein sized and shaped for receiving the gasket 506. The cavity 616 has a depth 618, a width 620, an outer diameter (not shown) and an inner diameter (not shown).

The tubular body 530 is configured to engage a bulkhead 104, 106. Accordingly, the tubular body 530 can have threads 622 disposed thereon. The threads 622 facilitate the securement of the cable stud 504 to a bulkhead (e.g., the bulkheads 104, 106 of FIGS. 1-2). The threads 622 have a height 624. The tubular body has a height 626. The threads 622 are disposed a predetermined distance from a face 628 of the flange 536. The predetermined distance is defined by the difference between the heights 624 and 626. The tubular body 530 also has an aperture 630 formed therethrough. The aperture 630 is sized and shaped for receiving a portion of a cable (e.g., the cable 102 of FIGS. 1-2) with an insulation jacket (e.g., the jacket 306 of FIG. 3) removed therefrom (as shown in FIGS. 3-4). The aperture 630 has a diameter 642 smaller than the diameter 608 of the aperture 604 of the tubular body 532.

The tubular body 534 is defined by an annular sidewall 634 having a thickness 636 and an outer diameter 638. The tubular body 532 is also defined by the aperture 630 formed therethrough. The aperture 630 is at least partially defined by an inner surface 640 of the sidewall 634. The aperture 630 has a diameter 642.

It should be noted that the cable stud assembly 108 described above includes less custom parts than conventional cable stud assemblies. As such, the cable stud assembly 108 is less expensive to manufacture. Also, the cable stud assembly 108 has an improved pull out resistance and leak resistance as compared to that of conventional cable stud assemblies. For example, embodiments of the present invention have a pull out resistance to seventy pounds (70 lbs) and a leak resistance to ten pounds per square inch (10 PSI) internal pressure. Further, the process for assembling the cable stud assembly 108 is less time consuming, labor intensive and cumbersome as compared to that of conventional cable stud assemblies. An exemplary process for assembling the cable stud assembly 108 will now be described in relation to FIG. 7.

Figure 7:
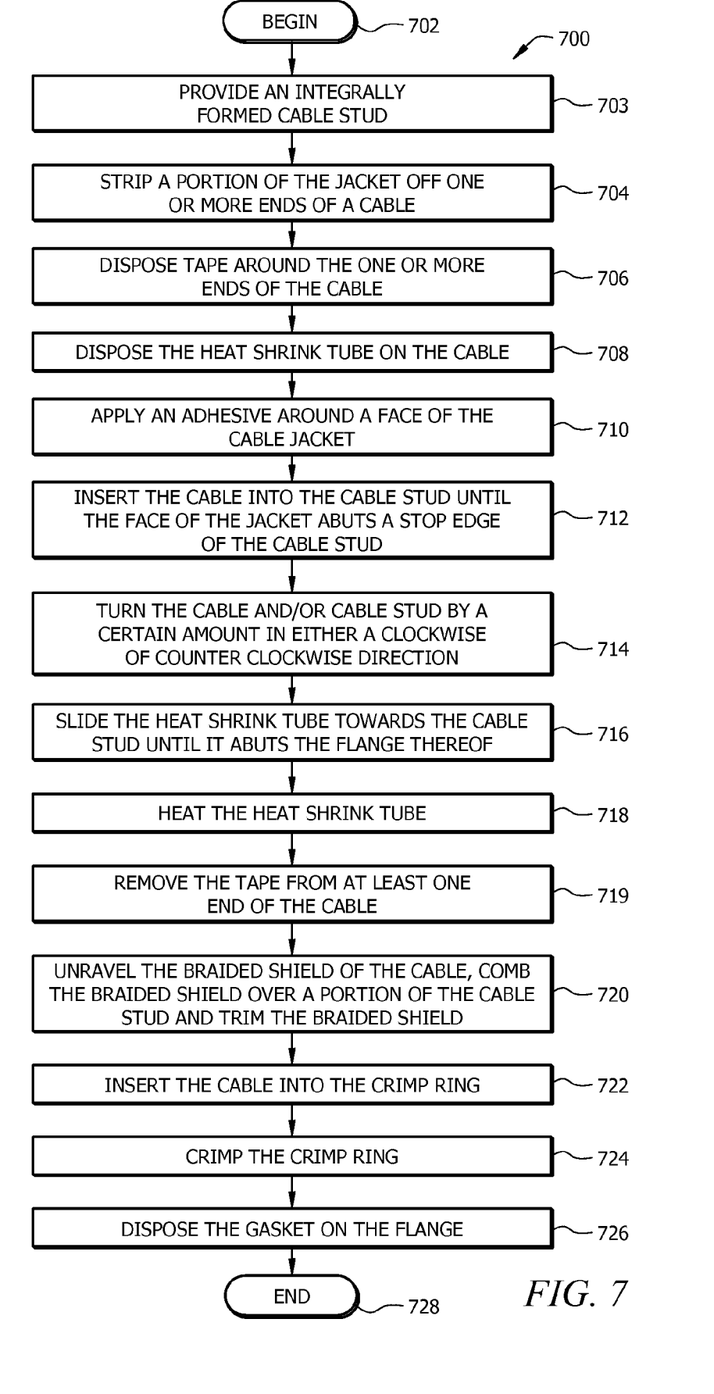
FIG. 7 is a flow diagram of an exemplary method for assembling a cable stud assembly that is useful for understanding the present invention.

The following FIG. 7 and accompanying text illustrate a method according to an embodiment of the present invention for assembling a cable stud assembly. It should be appreciated, however, that the method for assembling a cable stud assembly disclosed herein is provided for purposes of illustration only and that embodiments of the present invention are not limited solely to the methods shown.

Referring now to FIG. 7, there is provided a flow diagram of a method 700 for assembling a cable stud assembly 108 according to an embodiment of the present invention. As shown in FIG. 7, the method 700 begins with step 702 and continues with step 703. In step 703, a cable stud (e.g., the cable stud 108 of FIGS. 1-6) is provided. A perspective view of a cable stud 504 is provided in FIG. 5. As shown in FIG. 5, the cable stud 504 comprises a plurality of tubular bodies 530, 532, 534 and a flange 536 integrally formed. The tubular bodies 530, 532, 534 are aligned along a common central axis 550.

Figure 8:
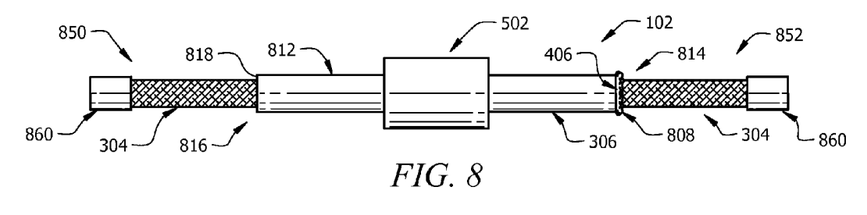
FIG. 8 is a side view of a cable having a portion of an exterior insulation material (or jacket) removed from opposing ends thereof.
Figure 9:
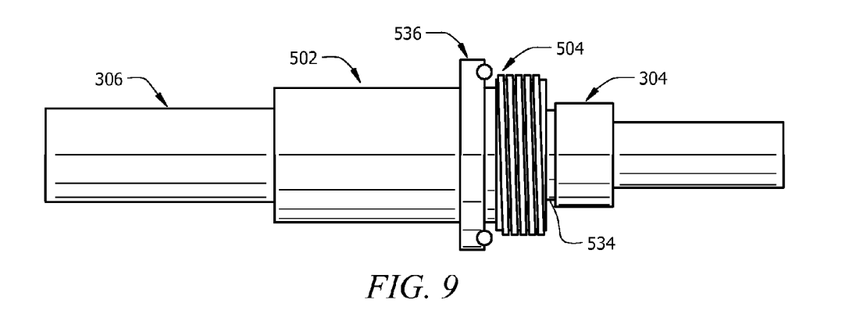
FIG. 9 is a side view of the cable of FIG. 8 with a cable stud and a heat deformable tube disposed thereon.
Figure 10:
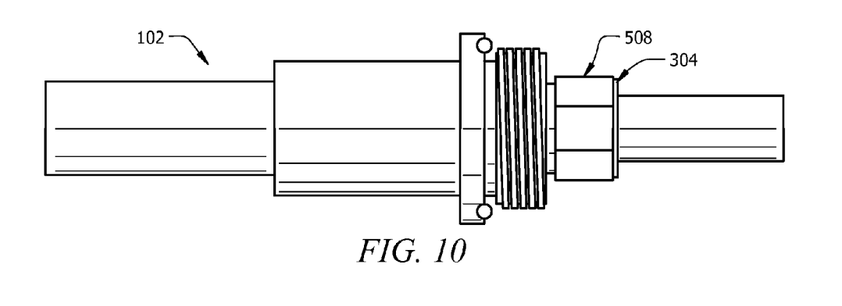
FIG. 10 is a side view of the cable of FIG. 9 with a crimp ring disposed on the cable stud.

In step 704, a portion of an insulation jacket (e.g., the jacket 306 shown in FIGS. 1-4) is stripped off (or removed from) one or more ends of a cable (e.g., the cable 102 shown in FIGS. 1-4). As a result, an underlying braided shield (e.g., the braided shield 304 shown in FIGS. 3-4) of the cable is exposed. A schematic illustration of the cable 102 having a portion of it's insulation jacket 306 removed from each end 850, 852 thereof is provided in FIG. 8. As shown in FIG. 8, a portion of a braided shield 304 is exposed at each end 850, 852 of the cable 102.

Next, step 706 is performed where tape is disposed around one or more ends of the cable. The tape is provided for protecting the insulated cable wires (e.g., the cable wires 302 shown in FIG. 3), the braided shield (e.g., the braided shield 304 shown in FIG. 3), and/or the foil shield (e.g., the foil shield 308 shown in FIG. 3) of the cable from damage (e.g., fraying) during the cable stud assembly process. The tape can include, but is not limited to, KAPTON® tape available from E.I. Du Pont De Nemours and Company Corporation of Wilmington, Del. A schematic illustration of a cable 102 having tape 860 disposed around each end 850, 852 thereof is provided in FIG. 8.

Upon completing step 706, step 708 is performed where at least one heat deformable tube (e.g., the heat deformable tube 502 of FIG. 5) is disposed on the cable. A schematic illustration of a heat deformable tube 502 disposed on a cable 102 is provided in FIG. 8. As shown in FIG. 8, the heat deformable tube 502 can be positioned over an insulation jacket 306 of the cable 102.

Thereafter, step 710 is performed where an adhesive (not shown) is applied around at least one annular face (e.g., the face 406 shown in FIG. 4) of the insulation jacket. The adhesive (not shown) improves a pull out resistance of a cable stud assembly (e.g., the cable stud assembly 108 shown in FIGS. 1-6) and the leak resistance of the cable stud assembly. The adhesive (not shown) also provides an environmental seal between the insulation jacket and a cable stud (e.g., the cable stud 504 shown in FIG. 5). A schematic illustration of an adhesive 808 disposed on an annular face 406 of an insulation jacket 306 is provided in FIG. 8. As shown in FIG. 8, the insulation jacket 306 is comprised of a tubular body 812 having two opposing ends 814, 816. An annular face 406, 818 is disposed at each end 814, 816 of the insulation jacket 306.

According to an embodiment of the present invention, the adhesive (not shown) is an adhesive having a product number HP 1000 available from Adhesive Systems, Inc. of Frankfort, Ill. The HP 1000 adhesive has a set time of approximately one (1) minute and a cure time of eight (8) hours. Embodiments of the present invention are not limited in this regard.

Subsequently, step 712 is performed where the cable is inserted into the cable stud until the annular face (e.g., the face 406 shown in FIG. 4) of the insulation jacket abuts a stop ledge (e.g., the stop ledge 404 shown in FIG. 4 and FIG. 6) of the cable stud. A schematic illustration of an annular face 406 of an insulation jacket 306 abutting a stop ledge 404 is provided in FIG. 4.

Thereafter, step 714 is performed where the cable and/or cable stud is turned a certain amount (e.g., a quarter turn) in either a clockwise direction or counter clockwise direction. Step 714 can be performed for ensuring that the adhesive is uniformly disposed between the face of the cable jacket and the stop ledge of the cable stud.

In step 716, the heat deformable tube is slid towards the cable stud unit it abuts the flange (e.g., the flange 536 shown in FIGS. 5-8) of the cable stud. A schematic illustration of a heat deformable tube 502 abutting a flange 536 of the cable stub 504 is provided in FIG. 9. Once step 716 is completed, the method 700 continues with step 718. Step 718 involves heating the heat deformable tube using a heating means. As a result of being heated, the diameter of the heat deformable tube is reduced such that it snuggly fits around a portion of the cable and a first tubular body (e.g., the tubular body 532 shown in FIGS. 5-6) of the cable stud. Notably, the heat deformable tube advantageously supports the adhesive (not shown) during the cure time. As such, the amount of time required to assemble the cable stud assembly is significantly reduced as compared to the time required to assemble conventional cable stud assemblies.

Next step 719 involves removing the tape from at least one end of the cable. Thereafter, step 720 is performed where the braided shield of the cable can be unraveled. Step 720 can also involve combing the braided shield over one of the tubular bodies (e.g., the tubular body 534 shown in FIGS. 5-6) of the cable stud. Step 720 can further involve trimming the braided shield. Still, embodiments of the present invention are not limited in this regard. For example, step 720 can alternatively involve cutting the braided shield of the cable and rolling the braided shield over one of the tubular bodies of the cable stud. A schematic illustration of a braided shield 304 combed or rolled over one of the tubular bodies 534 of the cable stud 536 is provided in FIG. 9.

After the braided shield is placed over one of the tubular bodies of the cable stud, step 722 is performed where the cable is inserted into a crimp ring (e.g., the crimp ring 508 shown in FIGS. 5-6). Step 722 can also involve moving the crimp ring towards the cable stud until it is positioned over the braided shield of the cable and the second tubular body of the cable stud. A schematic illustration of a crimp ring 508 disposed over the braided shield 304 of the cable 102 is provide in FIG. 10.

In the next step 724, the crimp ring is crimped using a crimping tool. As a result, an electrical and mechanical connection is formed between the braided shield of the cable and the second tubular body of the cable stud. Notably, the crimp ring advantageously supports the adhesive during the cure time. As such, the amount of time required to assembly the cable stud assembly is significantly reduced as compared to the time required to assemble conventional cable stud assemblies. Lastly, a gasket (e.g., the gasket 506 shown in FIGS. 5-6) is disposed in cavity (e.g., the cavity 616 of FIG. . 6) formed in the flange of the cable stud. Subsequently, step 728 is performed where the method 700 ends or other steps are performed (such as coupling the cable stud to a bulkhead).

It should be noted that the method 700 can be modified in accordance with an overmold anchor scenario. For example, if the cable stud includes an overmold anchor, then the method 700 can be absent of steps 708, 710, 714, 716, 718. The method 700 can include a step (not shown) subsequent to step 712 that involves inserting the cable stud with the cable inserted therethough into an injection molding device. The method 700 can also include a step (not shown) involving disposing a securing member (e.g., a plastic member) around a portion of the cable adjacent to the cable stud and the overmold anchor. Thereafter, steps 719-728 can be performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

I claim:

1. A method for assembling a cable assembly, comprising:
    providing an integrally formed cable stud including a plurality of tubular bodies of different sizes horizontally aligned along a common central axis and a flange positioned between a first and a second one of the plurality of tubular bodies and extending outwardly therefrom;
    removing an exterior insulation material from an end of a cable;
    positioning a heat deformable tube on a portion of the cable;
    applying an adhesive around an annular face of the exterior insulation material disposed at an end thereof;
    inserting the cable into the integrally formed cable stud until the annular face of the exterior insulation material abuts a stop ledge of the integrally formed cable stud;
    sliding the heat deformable tube along the cable towards the integrally formed cable stud until the heat deformable tube is at least partially positioned over the first one of the plurality of tubular bodies and heating the heat deformable tube to form an environmental seal between the cable and the integrally formed cable stud;
    sandwiching a portion of a shield material of the cable between a crimp ring and a third one of the plurality of tubular bodies adjacent to the second one of the plurality of tubular bodies to provide a 360° electrical shield; and
    cutting the shield material to a predefined length and rolling the shield material over the third one of the plurality of tubular bodies prior to sandwiching the portion of the shield material.

2. The method according to claim 1, further comprising disposing a gasket in a cavity formed in the flange of the integrally formed cable stud.

3. The method according to claim 1, further comprising disposing a layer of adhesive on an inner surface of the heat deformable tube.

4. The method according to claim 1, wherein the first one of the tubular bodies has an inner diameter larger than inner diameters of the second and third ones of the tubular bodies.

5. A method for assembling a cable assembly, comprising:
    providing an integrally formed cable stud including a plurality of tubular bodies of different sizes horizontally aligned along a common central axis and a flange positioned between a first and a second one of the plurality of tubular bodies and extending outwardly therefrom;
    removing an exterior insulation material from an end of a cable;
    positioning a heat deformable tube on a portion of the cable;
    applying an adhesive around an annular face of the exterior insulation material disposed at an end thereof;
    inserting the cable into the integrally formed cable stud until the annular face of the exterior insulation material abuts a stop ledge of the integrally formed cable stud;
    sliding the heat deformable tube along the cable towards the integrally formed cable stud until the heat deformable tube is at least partially positioned over the first one of the plurality of tubular bodies and heating the heat deformable tube to form an environmental seal between the cable and the integrally formed cable stud;
    sandwiching a portion of a shield material of the cable between a crimp ring and a third one of the plurality of tubular bodies adjacent to the second one of the plurality of tubular bodies to provide a 360° electrical shield; and
    unraveling the shield material and combing the unraveled shield material over the third one of the plurality of tubular bodies prior to sandwiching the portion of the shield material.

6. The method according to claim 5, further comprising disposing a gasket in a cavity formed in the flange of the integrally formed cable stud.

7. The method according to claim 5, further comprising disposing a layer of adhesive on an inner surface of the heat deformable tube.

8. The method according to claim 5, wherein the first one of the tubular bodies has an inner diameter larger than inner diameters of the second and third ones of the tubular bodies.

9. A method for assembling a cable assembly, comprising:
    providing an integrally formed cable stud including a plurality of tubular bodies of different sizes horizontally aligned along a common central axis and a flange positioned between a first and a second one of the plurality of tubular bodies and extending outwardly therefrom;
    removing an exterior insulation material from an end of a cable;
    positioning a heat deformable tube on a portion of the cable;
    applying an adhesive around an annular face of the exterior insulation material disposed at an end thereof;
    inserting the cable into the integrally formed cable stud until the annular face of the exterior insulation material abuts a stop ledge of the integrally formed cable stud;
    sliding the heat deformable tube along the cable towards the integrally formed cable stud until the heat deformable tube is at least partially positioned over the first one of the plurality of tubular bodies and heating the heat deformable tube to form an environmental seal between the cable and the integrally formed cable stud;
    sandwiching a portion of a shield material of the cable between a crimp ring and a third one of the plurality of tubular bodies adjacent to the second one of the plurality of tubular bodies to provide a 360° electrical shield; and
    disposing tape around the end of the cable subsequent to removing an exterior insulation material from the end of a cable.

10. The method according to claim 9, further comprising disposing a gasket in a cavity formed in the flange of the integrally formed cable stud.

11. The method according to claim 9, further comprising disposing a layer of adhesive on an inner surface of the heat deformable tube.

12. The method according to claim 9, wherein the first one of the tubular bodies has an inner diameter larger than inner diameters of the second and third ones of the tubular bodies.

13. The method according to claim 9, further comprising removing the tape from the end of the cable prior to sandwiching the portion of the shield material.

14. A cable assembly, comprising:
- an integrally formed cable stud including a plurality of tubular bodies of different sizes horizontally aligned along a common central axis and having a flange positioned between a first and a second one of the plurality of tubular bodies and extending outwardly therefrom;
- a cable inserted into the integrally formed cable stud, said cable having an exterior insulation removed from an end thereof to define an annular face of said insulation material, said annular face abutting a stop ledge of the integrally formed cable stud;
- an adhesive disposed around said annular face of the exterior insulation material securing said exterior insulation material to an annular interior surface of a first one of the tubular bodies;
- a heat deformed tube formed of a heat deformable material disposed on a portion of the cable, and further extending over a portion of said first tubular body, said heat deformed tube forming an environmental seal between the cable and the integrally formed cable stud;
- a shield material of the cable extending through an interior of a third one of the plurality of tubular bodies adjacent to the second one of the plurality of tubular bodies, said shield material having a predefined length extending from an end of said third one of said tubular bodies and rolled over an annular surface defined by said third one of said plurality of tubular bodies to provide a 360° electrical shield; and
- wherein a portion of said shield material of the cable is sandwiched between a crimp ring and said third one of the plurality of tubular bodies.

15. The cable assembly according to claim 14, further comprising a layer of adhesive disposed on an inner surface of the heat deformable tube.

16. The cable assembly according to claim 14, wherein the first tubular body has an inner diameter larger than inner diameters of the second and third tubular bodies.

17. The cable assembly according to claim 14, further comprising an annular gasket disposed in annular recess on a face of said flange facing toward said third one of said plurality of tubular bodies.

18. A cable assembly, comprising:
- an integrally formed cable stud including a plurality of tubular bodies of different sizes horizontally aligned along a common central axis and having a flange positioned between a first and a second one of the plurality of tubular bodies and extending outwardly therefrom;
- a cable inserted into the integrally formed cable stud, said cable having an exterior insulation removed from an end thereof to define an annular face of said insulation material, said annular face abutting a stop ledge of the integrally formed cable stud;
- an adhesive disposed around said annular face of the exterior insulation material securing said exterior insulation material to an annular interior surface of a first one of the tubular bodies;
- a molded plastic member disposed on a portion of the cable, and further extending over a portion of said first tubular body, said molded plastic member forming an environmental seal between the cable and the integrally formed cable stud and engaging an overmold anchor disposed on said first tubular body;
- a shield material of the cable extending through an interior of a third one of the plurality of tubular bodies adjacent to the second one of the plurality of tubular bodies, said shield material having a predefined length extending from an end of said third one of said tubular bodies and rolled over an annular surface defined by said third one of said plurality of tubular bodies to provide a 360° electrical shield; and
- wherein a portion of said shield material of the cable is sandwiched between a crimp ring and said third one of the plurality of tubular bodies.

* * * * *